(12) United States Patent
Levy et al.

(10) Patent No.: US 10,830,954 B1
(45) Date of Patent: Nov. 10, 2020

(54) SYSTEMS AND METHODS FOR EFFICIENT COUPLING BETWEEN INTEGRATED PHOTONIC WAVEGUIDES AND ELECTRO-OPTIC RESONATOR

(71) Applicant: GM Cruise Holdings LLC, San Francisco, CA (US)

(72) Inventors: Jacob Levy, Sierra Madre, CA (US); Vala Fathipour, Pasadena, CA (US); Lutfollah Maleki, Pasadena, CA (US); Vladimir S. Ilchenko, Arcadia, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 16/431,677

(22) Filed: Jun. 4, 2019

(51) Int. Cl.
*G02B 6/293* (2006.01)
*G02F 1/035* (2006.01)
*G01S 7/481* (2006.01)
*G01S 17/89* (2020.01)

(52) U.S. Cl.
CPC .......... *G02B 6/29341* (2013.01); *G01S 7/481* (2013.01); *G01S 17/89* (2013.01); *G02F 1/035* (2013.01)

(58) Field of Classification Search
CPC ..... G02B 6/29341; G01S 17/89; G01S 7/481; G02F 1/035
See application file for complete search history.

(56) References Cited

U.S. PATENT DOCUMENTS

| 6,891,865 | B1* | 5/2005 | Ma | H01S 5/141 |
| | | | | 372/20 |
| 2005/0220411 | A1* | 10/2005 | Ilchenko | G02B 6/12007 |
| | | | | 385/39 |
| 2006/0114960 | A1* | 6/2006 | Snee | B82Y 20/00 |
| | | | | 372/67 |
| 2006/0285799 | A1* | 12/2006 | Spillane | G02B 6/12007 |
| | | | | 385/50 |
| 2008/0008418 | A1* | 1/2008 | Smith | G01N 21/648 |
| | | | | 385/32 |
| 2009/0032805 | A1* | 2/2009 | Ty Tan | B82Y 20/00 |
| | | | | 257/25 |
| 2011/0075967 | A1* | 3/2011 | Bratkovski | G02F 1/095 |
| | | | | 385/16 |
| 2016/0131844 | A1* | 5/2016 | Yang | G02B 6/12007 |
| | | | | 359/330 |
| 2016/0299228 | A1* | 10/2016 | Maleki | H01S 3/00 |
| 2018/0095107 | A1* | 4/2018 | Dunn | G01Q 60/06 |
| 2018/0306696 | A1* | 10/2018 | Ozdemir | G01N 15/1434 |

* cited by examiner

*Primary Examiner* — Leslie C Pascal
(74) *Attorney, Agent, or Firm* — Medley, Behrens & Lewis, LLC

(57) ABSTRACT

An optical coupling device is described herein. The optical coupling device comprises a first waveguide and a second waveguide that are formed on a common substrate, and a resonator that is positioned out of plane with the two waveguides. The resonator and waveguides are positioned such that light traveling in each of the waveguides evanescently couples to the resonator but not to the other of the waveguides. The optical coupling device can be used in connection with improving linewidth of a laser source for a lidar sensor. In another example, the optical coupling device can be used in connection with wavelength division multiplexing.

16 Claims, 7 Drawing Sheets

SYSTEMS AND METHODS FOR EFFICIENT COUPLING BETWEEN INTEGRATED PHOTONIC WAVEGUIDES AND ELECTRO-OPTIC RESONATOR

BACKGROUND

Photonic integrated circuits (PICs) are devices that incorporate optical components and optionally electrical components in a same device, commonly on a same substrate. Conventionally, PICs are manufactured according to techniques that are similar to semiconductor fabrication techniques used to fabricate conventional electrical integrated circuits (ICs). For example, PICs have been manufactured using selective deposition and epitaxial growth of layers and films of various materials on a substrate.

Lidar sensors emit one or more beams of light and identify distances to and speeds of various objects in an operational environment of the sensor based upon reflections of the beams from the objects. Lidar sensors incorporate various optical and electrical elements that facilitate emission or reception of light. By way of example, a lidar sensor can include a laser along with various componentry to control emission of the laser, such as waveguides. Such componentry can be included in a PIC that embodies a laser source for a lidar sensor.

In conventional PIC devices which incorporate a resonator for sensing or communication applications, the body of the resonator is monolithically integrated in a PIC and lies in a same plane as a waveguide to which the resonator is coupled. By way of example, a resonator can be grown epitaxially on the same substrate as the waveguide by way of a same process used to fabricate the waveguide. Due to limitations of materials and fabrication methods that are suitable for monolithic integrated circuit manufacturing, conventional coupling devices that incorporate co-planar waveguides and resonators tend to have low Q factors.

SUMMARY

The following is a brief summary of subject matter that is described in greater detail herein. This summary is not intended to be limiting as to the scope of the claims.

Described herein are various technologies pertaining to an optical coupling system that facilitates efficient optical coupling between integrated optical waveguides and an optical microresonator that is positioned out of the plane of the waveguides. Also described herein are various technologies relating to use of optical coupling systems described herein in connection with a laser coupled to a resonator as used, for example, with a lidar sensor, an optical coherence tomography (OCT) system, a bio-medical sensing system, communications systems, or wavelength division multiplexing (WDM) systems.

An exemplary optical coupling system comprises a first waveguide and a second waveguide that are formed on a same substrate. The optical coupling system further comprises a resonator that is out of plane with each of the first waveguide and the second waveguide. Stated differently, the resonator is positioned above or offset from the first waveguide and the second waveguide. Accordingly, the resonator is not formed on the same substrate as the first waveguide and the second waveguide. In exemplary embodiments, the optical coupling system can be coupled to a laser such that light emitted by the laser is carried by at least one of the waveguides.

In exemplary embodiments, the resonator is a whispering-gallery mode resonator. By way of example, and not limitation, the resonator can be a spherical resonator, a toroidal resonator, a ring resonator, or the like. In further embodiments, the resonator is a crystalline resonator, wherein the resonator is formed substantially of a polycrystalline or monocrystalline material. In a non-limiting example, the resonator structure can be formed by mechanical polishing of a crystalline element, or any of various other suitable manufacturing methods.

The resonator is coupled to each of the first waveguide and the second waveguide by evanescent field coupling. Accordingly, the resonator is positioned above the waveguides sufficiently close to facilitate evanescent field coupling between the resonator and the waveguides. Furthermore, the resonator can be positioned such that a surface of the resonator that is positioned closest to the waveguides is substantially parallel to the waveguides, in order to facilitate efficient coupling between the resonator and the waveguides.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
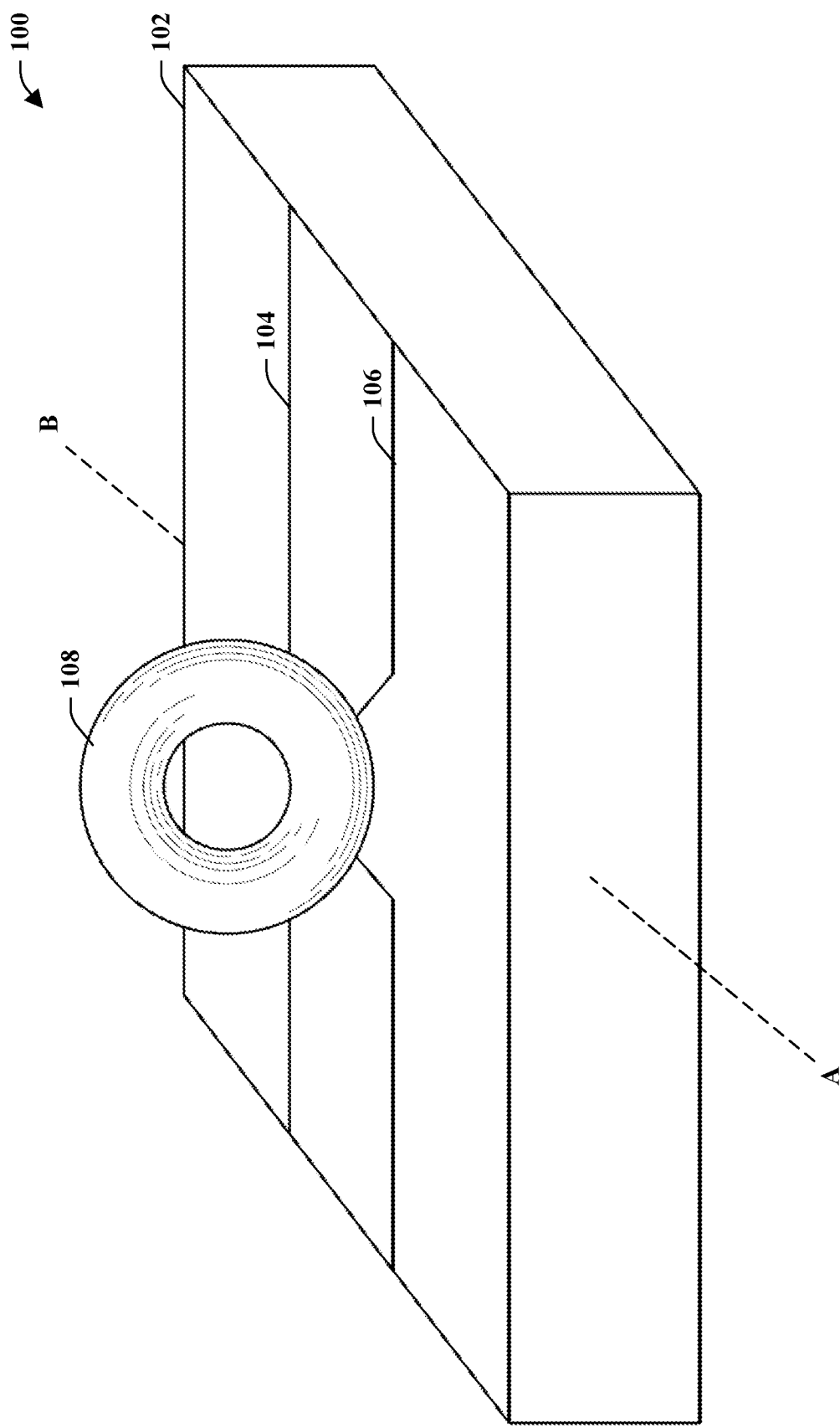
FIG. 1 illustrates an exemplary optical coupling device

Various technologies pertaining to an optical coupling system that facilitates efficient optical coupling between integrated optical waveguides, a laser, and a resonator that is positioned out of the plane of the waveguides are described herein, wherein like reference numerals are used to refer to like elements throughout. Further, various technologies are described herein that relate to a lidar sensor system that incorporates any of various optical coupling systems set forth in detail below. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components.

Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. The terms "component" and "system" are also intended to encompass one or more optical devices that can be configured or coupled together to perform various functionality with respect to an optical signal. It is also to be understood that a component or system may be localized on a single device or distributed across several devices. Further, as used herein, the term "exemplary" is intended to mean serving as an illustration or example of something and is not intended to indicate a preference.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

With reference now to FIG. 1, an exemplary optical coupling device 100 is illustrated. The optical coupling device 100 comprises a substrate 102, a first waveguide 104, a second waveguide 106, and a resonator 108. The optical coupling device 100 facilitates coupling of light that travels in the first waveguide 104 with light that travels in the second waveguide 106 by way of the resonator 108 rather than by coupling between the waveguides 104, 106 directly. In other words, each of the first waveguide 104 and the second waveguide 108 couples to the resonator 108 such that light traveling in the first waveguide 104 couples into the resonator 108 and light traveling in the second waveguide 106 also couples into the resonator 108. In the resonator 108, light from the two waveguides 104, 106 interacts to perform a desired function of the coupling device 100, according to design parameters of various elements of the coupling device 100 (e.g., dimensions and materials of the waveguides 104, 106 and the resonator 108, relative positions of the waveguides 104, 106 and the resonator 108, etc.). By way of example, and as described in greater detail below, the optical coupling device 100 can be employed in connection with self-injection locking or other locking schemes of a laser for lidar or OCT applications or in wavelength division multiplexing, or communication applications.

The substrate 102 can be a dielectric element such as silicon, glass, silicon nitride, lithium niobate or the like. The first waveguide 104 and the second waveguide 106 are formed on the substrate 102. The waveguides 104, 106 can be formed according to various techniques for PIC manufacturing (e.g., epitaxial growth, deposition, etching, photolithography, etc.). The waveguides 104, 106 can be formed on the substrate 102 from any of a variety of materials such as silica, silicon, silicon nitrite, lithium niobate, indium phosphide, or the like. Each of the waveguides 104, 106 is configured to provide a path for confinement of light along the path of the waveguide. In various embodiments, and as described in greater detail below with respect to FIG. 3, a cladding layer (not shown in FIG. 1) can be deposited on top of the waveguides 104, 106 to facilitate confinement of light within the waveguides 104, 106. In exemplary embodiments, the cladding layer has a lower index of refraction than the material used to form the waveguides 104, 106.

The resonator 108 is positioned out of plane with the waveguides 104, 106. Stated differently, the resonator 108 is positioned above the waveguides 104, 106 rather than being deposited on the same substrate 102 as the waveguides 104, 106. The resonator 108 is optically coupled to the waveguides 104, 106 by way of evanescent field coupling. Therefore, the resonator 108 is positioned proximally to the waveguides 104, 106 in order to facilitate evanescent field coupling. In exemplary embodiments, the resonator 108 is positioned within a distance comparable to the wavelength of light propagating in the waveguides 104, 106 (e.g., within a distance of three times, two times, or one time the wavelength of light propagating in the waveguides 104, 106). In one exemplary embodiment, the resonator 108 is positioned within 200 nanometers of the waveguides 104, 106.

The resonator 108 is positioned such that the waveguides 104, 106 face a same side of the resonator 108 rather than being on opposite sides of the resonator 108. The resonator 108 can be positioned above the waveguides 104, 106 such that a surface of the resonator 108 that is positioned closest to the waveguides 104, 106 is substantially parallel to a plane that extends through the lengths of the waveguides 104, 106. Positioning the surface of the resonator 108 that is closest to the waveguides 104, 106 substantially parallel to the waveguides 104, 106 facilitates evanescent field coupling between the resonator 108 and the waveguides 104, 106. In exemplary embodiments the surface of the resonator 108 can be curved. In such embodiments, the resonator 108 can be positioned above the waveguides 104, 106 such that a plane that is tangent to the surface of the resonator 108 at a point of closest approach to the waveguides 104, 106 is parallel to the plane extending through the lengths of the waveguides.

Figure 2:
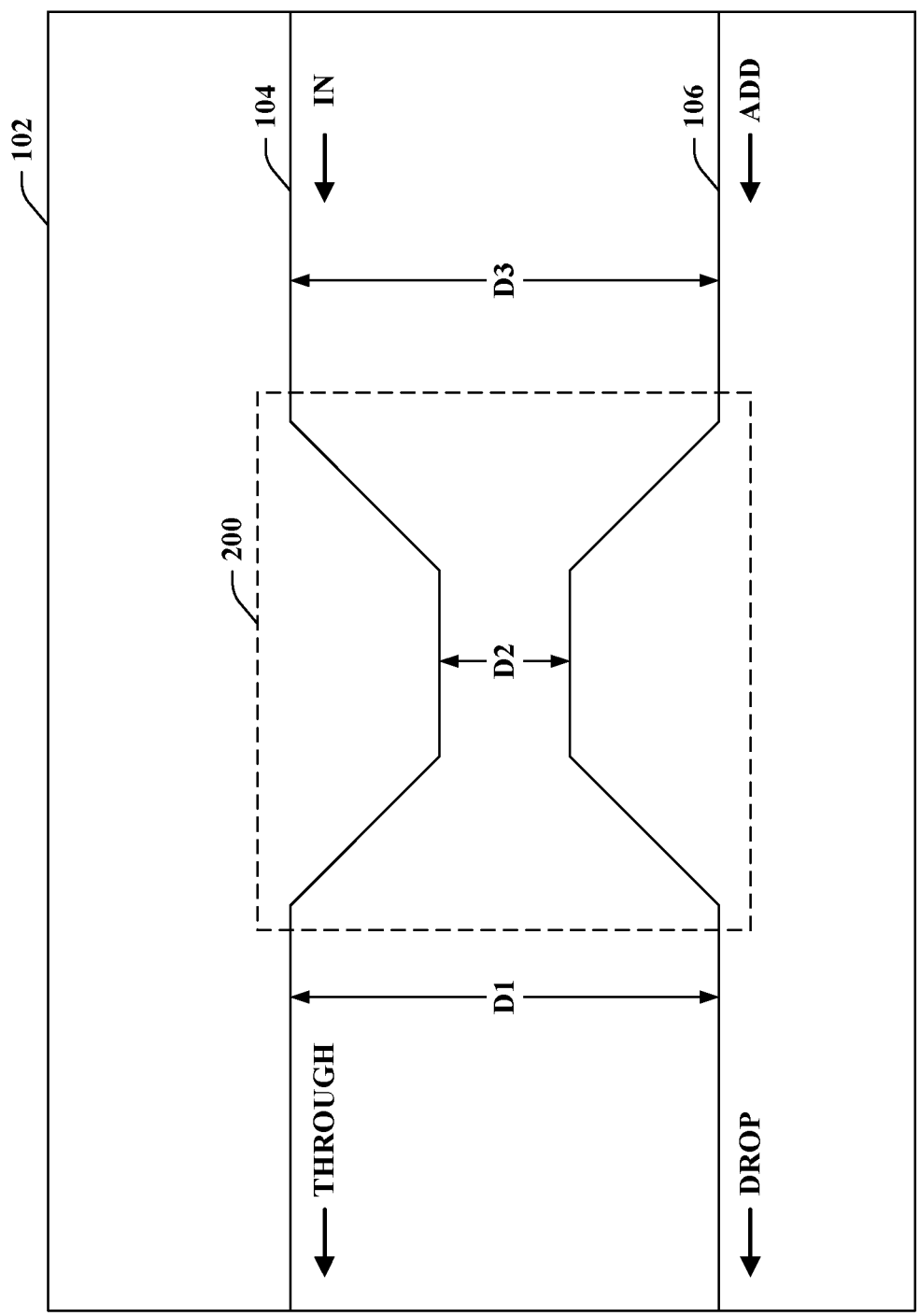
FIG. 2 is a top-down view of a substrate of the optical coupling device depicted in FIG. 1.

In exemplary embodiments, the waveguides 104, 106 and the resonator 108 are positioned to facilitate evanescent field coupling between each of the waveguides 104, 106 and the resonator 108, and to mitigate potential coupling between the waveguides 104, 106 themselves. By way of example, and not limitation, and referring now to FIG. 2, a top-view of the substrate 102 of the exemplary optical coupling device 100 is shown, wherein the waveguides 104, 106 define a constriction region 200. Within the constriction region 200, the waveguides 104, 106 approach each other more closely than outside the constriction region 200. The waveguides 104, 106 are positioned a distance of at least D1 apart on a first side of the constriction region 200. Within the constriction region 200 the waveguides 104, 106 approach to a minimum distance of D2 apart from one another, wherein the distance D2 is less than the distance D1. In exemplary embodiments, the distance D2 can be on the order, or smaller, than the wavelength of light propagating in the waveguides 104, 106, whereas the distance D1 can be large enough to support confinement and propagation of light without evanescent field coupling between the waveguides 104, 106 outside of the constriction region 200.

By positioning the waveguides 104, 106 at a greater distance apart from each other outside the constriction region 200 than within the constriction region 200, the potential for evanescent field coupling between the waveguide 104, 106 can be reduced. The waveguides 104, 106 can be positioned at a minimum distance of D3 apart from one another on a second side of the constriction region. The distance D3 is greater than the distance D2, but can be less than, greater than, or equal to the distance D1. It is to be understood that, in various other embodiments consistent with the present disclosure, the waveguides 104, 106 can be positioned such that there is no constriction region between them.

Figure 3:
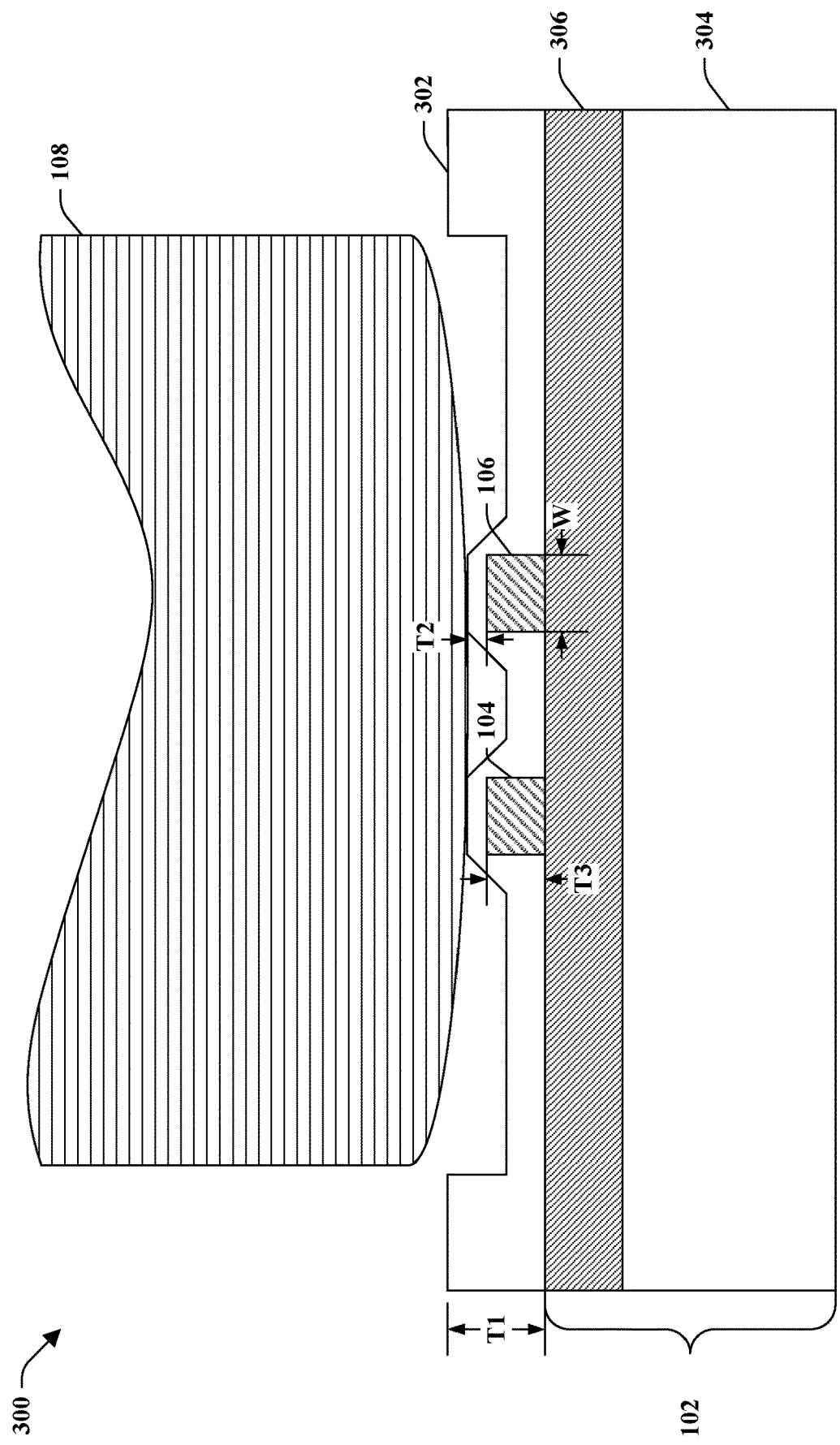
FIG. 3 is a cross-sectional view of the exemplary optical coupling device of FIG. 1.

Referring now to FIG. 3, a cross-sectional view 300 of the optical coupling device 100 is shown, wherein the cross-sectional view 300 is taken along axis A-B shown in FIG. 1. The cross-sectional view 300 illustrates the substrate 102, the waveguides 104, 106, and the resonator 108. The cross-sectional view 300 further illustrates a cladding layer 302 that is deposited on the substrate 102 and the waveguides 104, 106 in order to confine light within the waveguides 104, 106. Still further, the cross-sectional view 300 illustrates that, at least in some embodiments, the substrate 102 can include a base layer 304 and an oxide layer 306. In such embodiments, the oxide layer 306 can be formed on the base layer 304, and subsequently other components of a PIC (e.g., the waveguides 104, 106) can be formed on the oxide layer 306. By way of example, a device layer (not shown) can be deposited on the oxide layer 306 and various devices or components of a PIC can be formed out of the device layer (e.g., by various processing steps including photolithography, etching, deposition, etc.).

The cladding layer 302 is configured to facilitate confinement of light traveling within the waveguides 104, 106. In exemplary embodiments, therefore, a thickness T1 of the cladding layer 302 can be relatively large (e.g., greater than or equal to 750 nm, 1 micron, or 1.25 micron). In order to provide efficient evanescent field coupling between the waveguides 104, 106 and the resonator 108, the cladding layer 302 can be thinned in the vicinity of a point of closest approach of the waveguides 104, 106 and the resonator 108 (e.g., within the constriction region 200, where evanescent field coupling is likely to occur). By way of example, in a region positioned below the resonator 108 where evanescent field coupling between the waveguides 104, 106 and the resonator 108 is desired, the cladding layer 302 can be thinned to a thickness T2 of less than 150 nm, less than 100 nm, or less than 50 nm. The cladding layer 302 can be formed of silica, silicon nitride, aluminum oxide, hafnium dioxide, and the like.

Geometries of the various elements of the optical coupling device 100, such as the waveguides 104, 106 and the resonator 108 can be selected based upon desired performance attributes of the optical coupling device 100. By way of example, and not limitation, the widths and thicknesses of the waveguides 104, 106 can be selected to facilitate evanescent field coupling from the waveguides 104, 106 to the resonator 108 (and vice-versa) within particular ranges of wavelengths. In a non-limiting example, the waveguides 104, 106 can have widths W of greater than or equal to 340 nm and less than or equal to 350 nm when the waveguides 104, 106 have thicknesses T3 of 265-275 nm. In another example, the waveguides 104, 106 can have widths W of greater than or equal to 380 nm and less than or equal to 390 nm with thicknesses T3 of 215-225 nm. In these examples, the cladding layer 302 can have a thickness T2 of 50 nm or less. In some exemplary embodiments, the resonator 108 and the waveguides 104, 106 are formed with materials and geometries such that the waveguides 104, 106 are phase-matched to the resonator 108. For example, the width W and thicknesses T2 and T3 can be selected such that the waveguides 104, 106 are phase-matched to the resonator 108.

The resonator 108 can be held in place by any of various means. In a non-limiting example, the resonator 108 can be adhered to a PIC incorporating the waveguides 104, 108 by way of an adhesive. For instance, the resonator 108 can be adhered to the cladding layer 302 by way of an epoxy that has an index of refraction matched to the index of refraction of the cladding layer 302. In another example, the resonator 108 can be suspended above the waveguides 104, 106 by way of a cage mount that holds the resonator 108 in place. In such embodiments, the resonator 108 can be held by the cage mount such that the resonator 108 is aligned with various piezo-electric stages or tooling.

Since the resonator 108 is not monolithically integrated with the waveguides 104, 106 on the substrate 102, a greater range of materials is available for constructing the waveguides 104, 106 and the resonator 108 than in a coupler that monolithically integrates a waveguide with a resonator. By way of example, the resonator 108 can be formed of any of various crystalline materials such as calcium fluoride, magnesium fluoride, lithium niobate, lithium tantalate, or the like. The resonator 108 can therefore be made to have a higher Q-factor than a resonator that is monolithically integrated with waveguides of a PIC. By way of example, the resonator 108 can have an intrinsic Q-factor that is at least $10^8$. The optical coupling device 100 is thus well-suited to applications for which low loss and narrow linewidth are desirable, such as in a laser source for a lidar sensor system optical coherence tomography (OCT) system, or bio-medical sensing system, and wavelength division multiplexing (WDM) systems.

Figure 4:
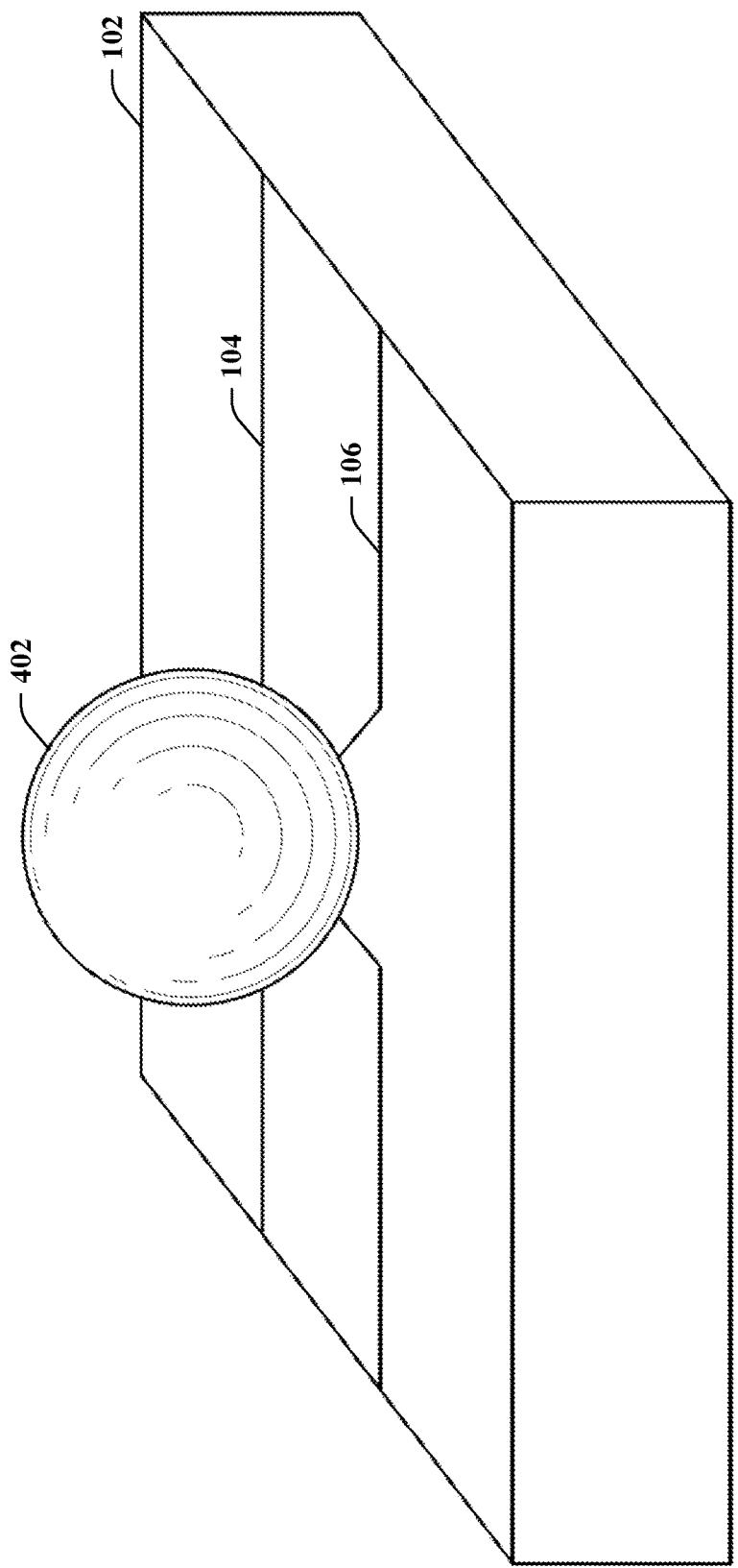
FIG. 4 illustrates another exemplary optical coupling device.
Figure 5:
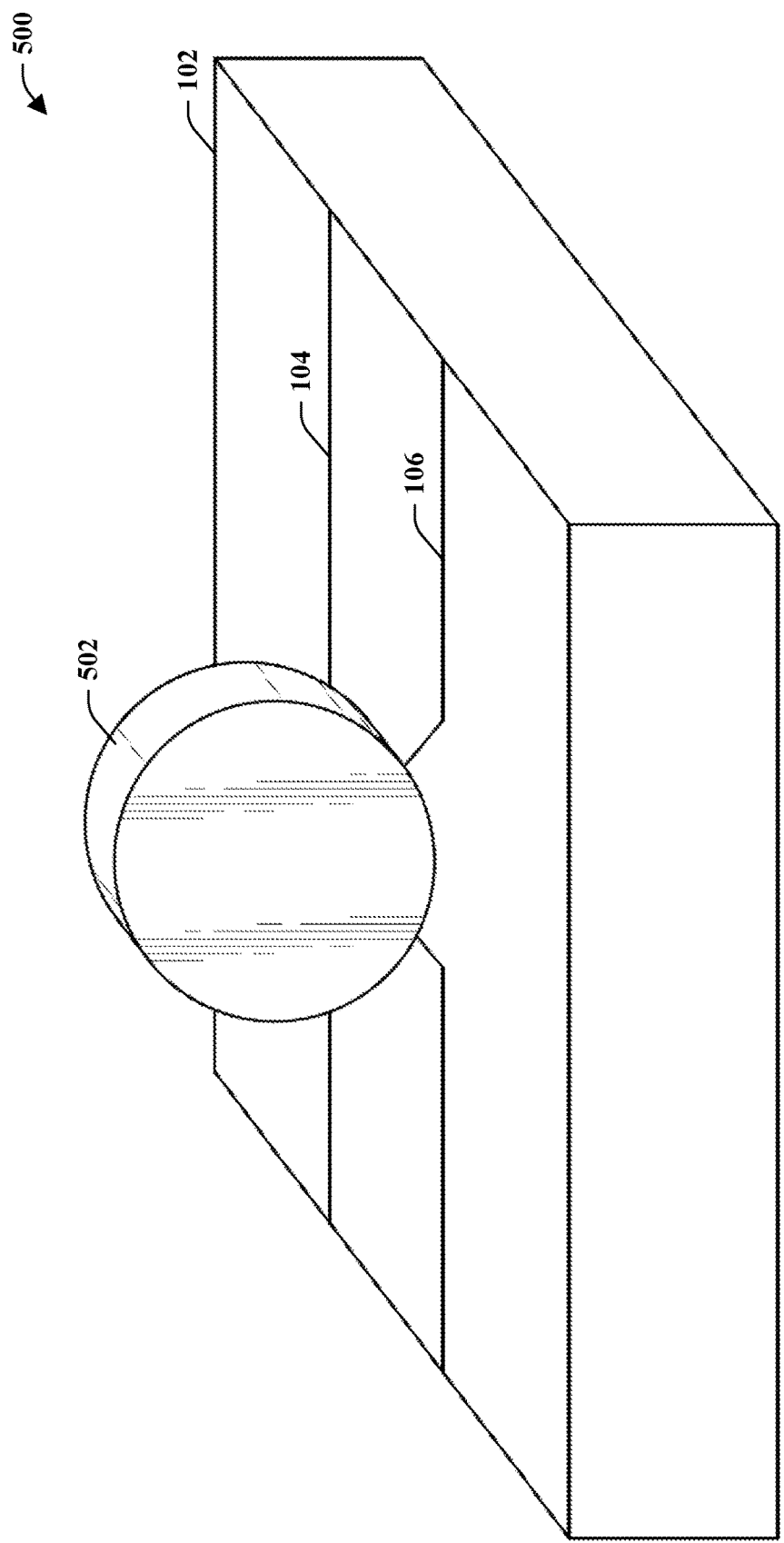
FIG. 5 illustrates yet another exemplary optical coupling device.

In an exemplary embodiment, the resonator 108 is a whispering gallery mode (WGM) resonator. By way of example, and referring again to FIG. 1, the resonator 108 is depicted as being a toroidal resonator or a ring resonator. However, it is to be understood that the resonator 108 can have any of various shapes. By way of example, and referring now to FIG. 4, an optical coupling device 400 is shown, wherein the optical coupling device 400 includes a spherical resonator 402. In another example, and referring now to FIG. 5, an optical coupling device 500 is shown, wherein the optical coupling device 500 includes a disk resonator 502.

The optical coupling devices 100, 400, 500 described herein can be incorporated in a lidar sensor system in order to improve linewidth of a laser source of the lidar sensor system. The optical coupling device 100 can have a two-input, two-output add-drop coupling configuration. With reference now once again to FIG. 2, the waveguide 104 comprises an input port IN and an output port THROUGH. The waveguide 106 comprises an input port ADD and an output port DROP. In an exemplary embodiment, the optical coupling device 100 can be used in a wavelength division multiplexer to add a wavelength to a first signal in the first waveguide 104. A second signal having the desirably added wavelength can be emitted into the second waveguide 106, whereupon the second signal couples to the resonator 108 and then to the first waveguide 104. The output THROUGH includes the added wavelength. In another exemplary embodiment, the optical coupling device 100 is used in connection with providing an injection-locked laser source for a lidar sensor system 118.

In various embodiments, the resonator 108 can be formed of a material that exhibits an electro-optic effect. The resonator 108 can be controlled to attenuate one or more wavelengths of light responsive to receipt of an electrical signal (e.g. a voltage, a current, or an electric field) at the resonator 108. Accordingly, operation of the optical coupling device 100 can be controlled by way of the electrical signal provided to the resonator 108. By way of an example, the resonator 108 can be controlled to attenuate wavelengths of light that are desirably eliminated from an input optical signal. In such example, an optical signal is input to the optical coupling device 100 at the IN port, wherein the optical signal includes a first wavelength of light and a second wavelength of light. The optical signal couples from the waveguide 104 to the resonator 108. The resonator 108 can be controlled to attenuate the second wavelength based upon receipt of an electrical signal at the resonator 108. When the optical signal couples from the resonator 108 back to the waveguide 104, the second wavelength is attenuated in the optical signal. Therefore, the optical signal output at the THROUGH port is attenuated in the second wavelength as compared to the optical signal input at the IN port.

Figure 6:
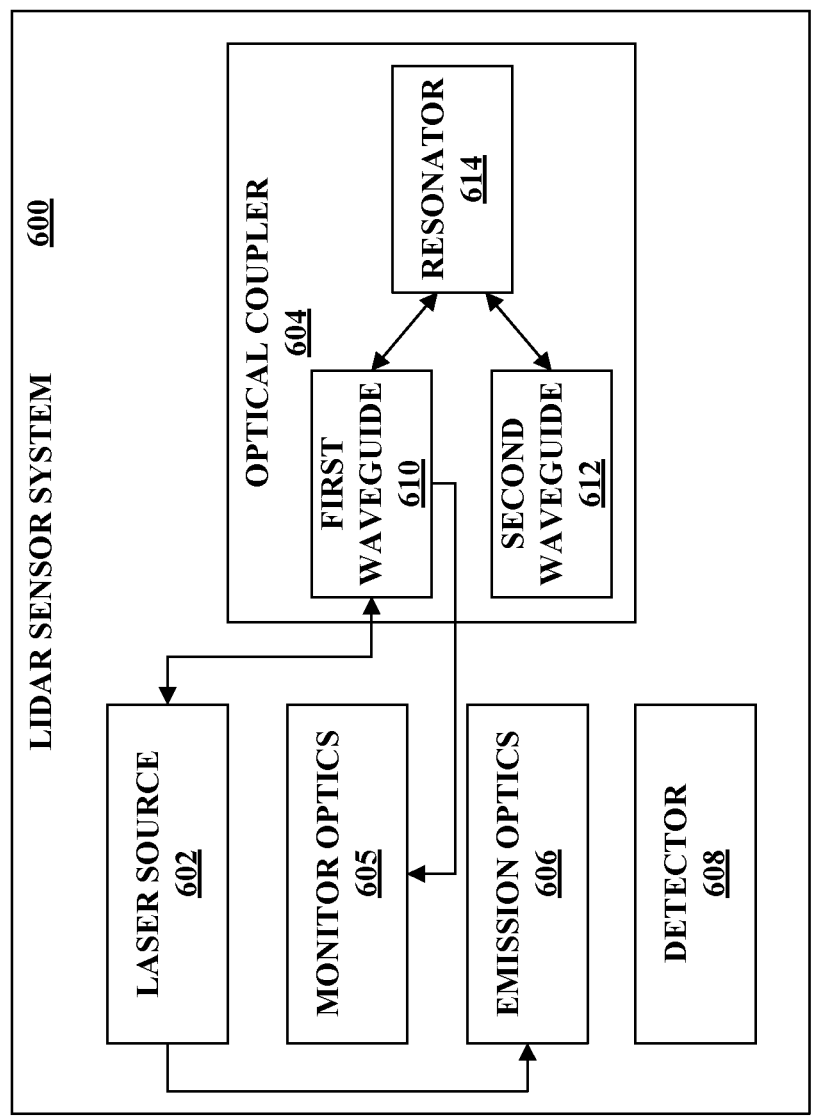
FIG. 6 is a functional block diagram of another exemplary lidar sensor system that incorporates an optical coupler.

The resonator 108 can be used to facilitate self-injection locking of a laser source of a lidar sensor system, or the like. In addition, an electro-optic effect of the resonator 108 can be used to facilitate a frequency chirp of a laser source for a frequency modulated continuous wave (FMCW) operation of a lidar sensor system. By way of example, and referring now to FIG. 6, a lidar sensor system 600 that uses self-injection locking is illustrated. The lidar sensor system 600 includes a laser source 602, an optical coupler 604 (e.g., configured as described with respect to any of the optical coupling devices 100, 400, 500), monitor optics 605, emissions optics 606, and an optical detector 608. The optical coupler 604 further includes a first waveguide 610, a second waveguide 612, and a resonator 614.

The optical coupler 604 can be configured to couple the output light of the laser source 602 to the resonator 614. In some embodiments the laser source may be integrated on the same substrate as the waveguides 610, 612 comprising the optical coupler 604. In other embodiments the laser source 602 may be a separate component that is separately coupled to the waveguides 610, 612 of the lidar chip. The laser source 602 emits an optical signal into a first input port of the first waveguide 610 of the coupler 604. A first output port of the first waveguide 610 of the coupler 604 is coupled to monitor optics 605 configured to detect the coupling between the laser source 602 and resonator 614 of the coupler 604. In some embodiments the monitor optics 605 may be on the same substrate as the waveguides 610, 612 and of the coupler 604. In other embodiments the monitor optics 605 may be comprised of independent components. Light traveling through the first waveguide 610 of the coupler 604 couples from the first waveguide 610, to the resonator 614, and then to the second waveguide 612 from the resonator 614. A second output port of the second waveguide 612 of the coupler 604 can be coupled to a reflector (not shown, and which may be on the same substrate as the waveguides or a separate component) to reflect light back into the resonator 614 of the coupler 604, whereupon the light couples back to the first waveguide 610 and travels out to the laser source 602, for increased injection locking efficiency. Accordingly, the light in the second waveguide 612 circulates a second time through the resonator 614 of the coupler 604, and is emitted back to the input port of the first waveguide 610 of the coupler 604. Due to the sufficiently large Q factor of the resonator in the optical coupler 604, when the light is reflected back to the first input port, the light interacts with the light emitted by the laser source 602 narrowing the linewidth and locking the laser frequency to the resonant frequency of the resonator 614. The injection-locked light is then emitted by the laser source 602 to the emission optics 606, whereupon the light is emitted into an operating environment of the lidar sensor system 600. Accordingly, the optical coupler 604 provides self-injection locking to reduce a linewidth of a signal output by the emission optics 606 relative to the optical signal initially output by the laser 602. Additionally, if the resonator 614 of optical coupler 604 changes frequency through electro-optic, thermo-optic, piezoelectric, carrier-dispersion or some other means, the signal output by the emission optics will also change making it suitable for an FMCW application. In the exemplary lidar sensor system 600, light emitted by the emission optics 606 and that is subsequently reflected from an object in the operating environment of the system 600 can be received at the detector 608. The detector 608 then outputs data indicative of a distance to the object or a speed of the object.

Referring once again to FIG. 1, the optical coupling device 100 can be configured such that a degree of coupling between resonator 108 and waveguides 104, 106 is independent of temperature within a range of temperatures. In exemplary embodiments, materials selected for each of the substrate 102, the waveguides 104, 106, and the resonator 108 can be selected to ensure that distances between the waveguides 104, 106 and between each of the waveguides 104, 106 and the resonator 108 are substantially invariant through a desired range of temperatures. By way of example, the waveguides 104, 106 can be formed from silica and the resonator 108 can be formed from quartz, thereby limiting movement of the waveguides 104, 106 and the resonator 108 due to thermal expansion in a temperature range of several degrees Celsius.

Figure 7:
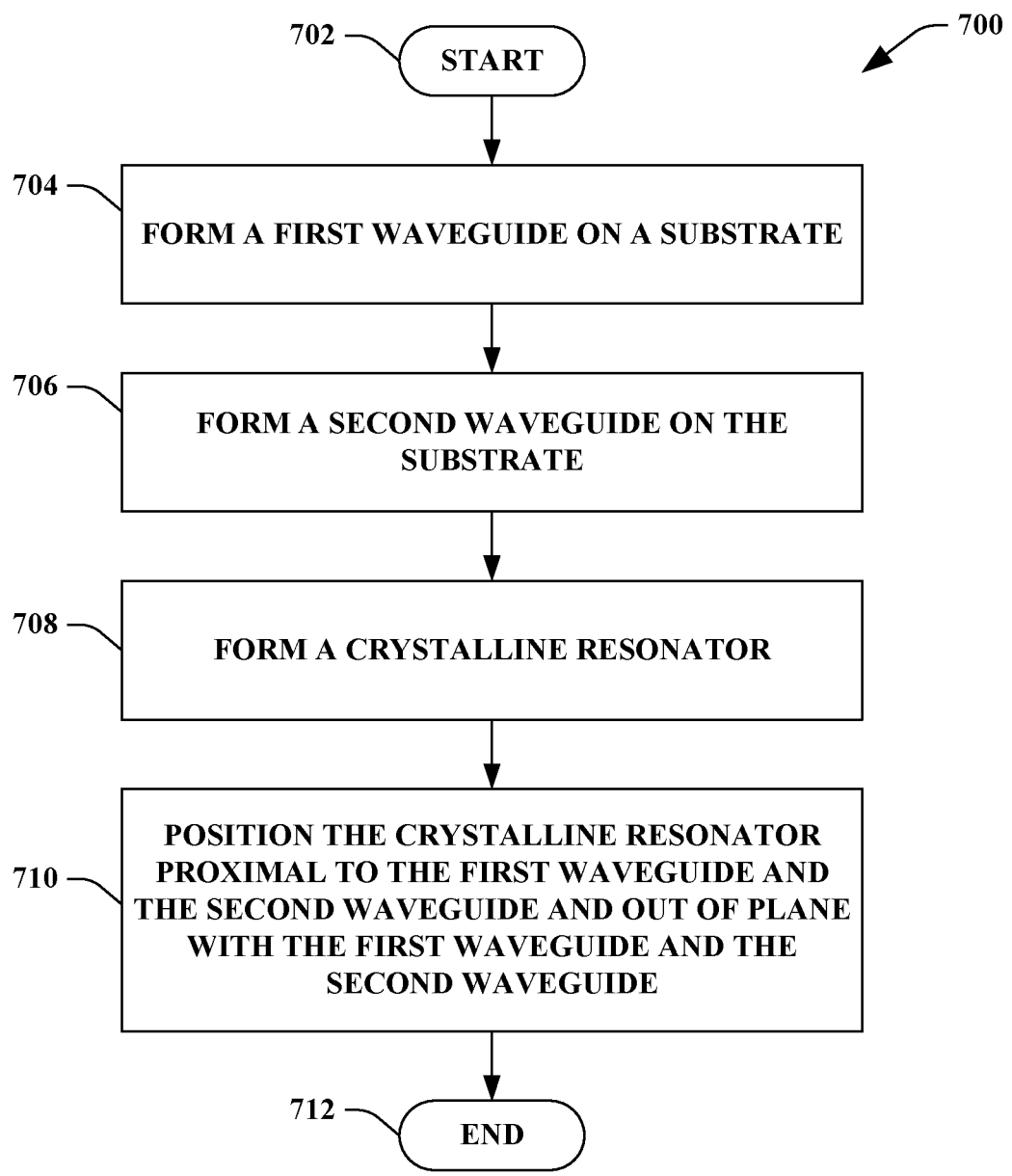
FIG. 7 is a flow diagram illustrating an exemplary methodology for manufacturing an optical coupling device.

FIG. 7 illustrates an exemplary methodology relating to manufacturing optical coupling devices described herein. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

Referring now to FIG. 7, an exemplary methodology 700 for manufacturing an optical coupling device is illustrated. The methodology 700 starts at 702, and at 704 a first waveguide is formed on a substrate. The waveguide can be formed on the substrate by way of any of various techniques for manufacturing PICs (e.g., deposition, epitaxial growth, photolithography, etc.). At 706 a second waveguide is formed on the same substrate as the first waveguide. It is to be understood that while forming of the first waveguide and the second waveguide 704 and 706 are listed as distinct steps, formation of the first waveguide and the second waveguide 704, 706 can occur substantially simultaneously (e.g., during simultaneous deposition or etching of material used to form the waveguides on a substrate). The first waveguide and the second waveguide can be formed sufficiently close that the waveguides can be evanescently coupled to a same resonator, but far enough apart such that the waveguides do not evanescently couple to one another (e.g., such that there is substantially no "cross-talk" between the two waveguides). At 708 a crystalline resonator is formed. The resonator can be formed by forming or obtaining a crystalline element of a material and then performing mechanical forming and polishing of the element to yield a resonator having a desired shape. In exemplary embodiments, the crystalline resonator is formed from a mono- or poly-crystalline element of one of calcium fluoride, magnesium fluoride, or lithium niobate. In further exemplary embodiments, the crystalline resonator is formed as a whispering-gallery-mode resonator. For example, the crystalline resonator can be formed to have a spherical shape, a toroidal shape, or a disk shape. At 710 the crystalline resonator is positioned proximally to the first waveguide and the second waveguide out of plane with the waveguides (e.g., offset from and external to the substrate). The crystalline resonator is positioned proximally to the waveguides such that light in the waveguides evanescently couples to the resonator. The methodology 700 then completes at 712.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An optical coupling device comprising:
   a first optical waveguide that is formed on a substrate;
   a second optical waveguide that is formed on the substrate such that the first optical waveguide and the second optical waveguide are substantially parallel within a constriction region of the first optical waveguide and the second optical waveguide; and
   an optical whispering-gallery-mode (WGM) resonator that is positioned above the constriction region of the first optical waveguide and the second optical waveguide, the optical WGM resonator having a curved surface that faces the first optical waveguide and the second optical waveguide within the constriction region, and wherein the optical WGM resonator is positioned proximally to the first optical waveguide and the second optical waveguide such that the first optical waveguide and the second optical waveguide are optically coupled to the optical WGM resonator by evanescent field coupling.

2. The optical coupling device of claim 1, wherein the optical WGM resonator is formed from a crystalline material.

3. The optical coupling device of claim 2, wherein the optical WGM resonator is formed of a material comprising one of calcium fluoride, magnesium fluoride, silicon, quartz, lithium tantalate or lithium niobate.

4. The optical coupling device of claim 1, wherein the first optical waveguide and the second optical waveguide are phase-matched to the optical WGM resonator.

5. The optical coupling device of claim 1, further comprising:
   a cladding layer that is formed on the substrate and that covers the first optical waveguide and the second optical waveguide such that the cladding layer is disposed between the optical WGM resonator and each of the first optical waveguide and the second optical waveguide.

6. The optical coupling device of claim 5, wherein the cladding layer has a first thickness in a first region and a second thickness in a second region, the first region being a region wherein the cladding layer covers the first optical waveguide, the second region being a region wherein the cladding layer covers the substrate, and wherein the first thickness is less than the second thickness.

7. The optical coupling device of claim 5, wherein the cladding layer is formed of a material comprising one of silica, silicon nitride, aluminum oxide, or hafnium dioxide.

8. The optical coupling device of claim 1, a smallest distance between the first optical waveguide and the second optical waveguide being within the constriction region.

9. The optical coupling device of claim 1, wherein a distance between the first waveguide and the second waveguide outside the constriction region is greater than a distance between the first waveguide and the second waveguide inside the constriction region.

10. The optical coupling device of claim 1, wherein the optical WGM resonator has an intrinsic Q-factor of at least $10^8$.

11. An optical coupling device comprising:
    a first waveguide; and
    a second waveguide, wherein the first waveguide and the second waveguide are formed on a same substrate such that the first waveguide and the second waveguide define a constriction region, a smallest distance between the first waveguide and the second waveguide being within the constriction region, wherein further the first waveguide and the second waveguide are substantially parallel within the constriction region; and
    a whispering-gallery-mode (WGM) resonator that is coupled to the first waveguide and the second waveguide by way of evanescent field coupling, and wherein the WGM resonator is positioned vertically above the constriction region of the first waveguide and the second waveguide such that a curved surface of the WGM resonator faces the first waveguide and the second waveguide within the constriction region.

12. The optical coupling device of claim 11, wherein the WGM resonator is formed from a crystalline material that exhibits an electro-optic effect.

13. The optical coupling device of claim 12, wherein the crystalline material comprises one of calcium fluoride, magnesium fluoride, quartz, lithium tantalate or lithium niobate.

14. The optical coupling device of claim 11, wherein the WGM resonator is a spherical resonator.

15. The optical coupling device of claim 11, wherein the WGM resonator is a toroidal resonator.

16. The optical coupling device of claim 11, wherein the WGM resonator is a disk resonator.

* * * * *